United States Patent
Hornberger

(10) Patent No.: US 7,431,249 B2
(45) Date of Patent: Oct. 7, 2008

(54) POUND-IN GLIDE FOR AN ARTICLE OF FURNITURE

(75) Inventor: Timothy G. Hornberger, Green Bay, WI (US)

(73) Assignee: Krueger International, Inc., Green Bay, WI (US)

( * ) Notice: Subject to any disclaimer, the term of this patent is extended or adjusted under 35 U.S.C. 154(b) by 151 days.

(21) Appl. No.: 10/543,131

(22) PCT Filed: Apr. 2, 2004

(86) PCT No.: PCT/US2004/010318

§ 371 (c)(1),
(2), (4) Date: Jul. 22, 2005

(87) PCT Pub. No.: WO2004/090350

PCT Pub. Date: Oct. 21, 2004

(65) Prior Publication Data

US 2006/0054755 A1 Mar. 16, 2006

Related U.S. Application Data

(60) Provisional application No. 60/460,065, filed on Apr. 3, 2003.

(51) Int. Cl.
*A47B 91/06* (2006.01)

(52) U.S. Cl. .............................. 248/188.9; 248/346.11; 16/42 R

(58) Field of Classification Search .............. 248/188.9, 248/188.91, 346.11; 16/42 R; 297/448.2, 297/344.11; 411/41, 45
See application file for complete search history.

(56) References Cited

U.S. PATENT DOCUMENTS

| | | | |
|---|---|---|---|
| 2,018,250 A | | 10/1935 | Cohan |
| 2,876,485 A | * | 3/1959 | Cowles ........................ 16/42 R |
| 2,888,775 A | * | 6/1959 | Thoeming ................. 248/188.9 |
| 3,254,362 A | * | 6/1966 | Rasor et al. .................. 16/42 R |
| 3,385,157 A | * | 5/1968 | Rapata ......................... 411/41 |
| 3,724,897 A | | 4/1973 | Faiks et al. |
| 4,761,093 A | | 8/1988 | Seymout |
| 4,830,556 A | * | 5/1989 | Nelson ......................... 411/41 |
| 4,923,158 A | * | 5/1990 | Saisho ...................... 248/188.8 |
| 5,088,669 A | * | 2/1992 | Zinnbauer ................. 248/188.9 |
| 5,163,795 A | * | 11/1992 | Benoit et al. .................. 411/45 |
| 5,820,217 A | * | 10/1998 | Horner et al. ........... 297/344.11 |

(Continued)

FOREIGN PATENT DOCUMENTS

BE 513190 3/1954

*Primary Examiner*—Anita M King
(74) *Attorney, Agent, or Firm*—Boyle Fredrickson, S.C.

(57) ABSTRACT

An article of furniture (22) having an opening (62) is configured with a support (20) operable to serve as a glide and as a floor surface protector. The support includes a body (40) having a boss (45) with a plurality of collapsible mounting boss sections (65). The boss sections define an axial passage (80, 90) therebetween and extending through the body. When inserted into the opening in the article of furniture, the edge defining the opening moves the boss sections radially inward relative to the edge of the opening toward a collapsed condition. The support further includes a wedge configured to be driven by an applied force into the passage of the body. The driven wedge is configured to move the boss sections apart against the edge of the opening to secure the body member to the article of furniture.

16 Claims, 5 Drawing Sheets

U.S. PATENT DOCUMENTS

| | | | |
|---|---|---|---|
| 6,032,589 A * | 3/2000 | Wang | 108/147.11 |
| 6,478,270 B2 * | 11/2002 | Parisi et al. | 248/188.8 |
| 6,623,082 B1 * | 9/2003 | Huang | 297/463.1 |
| 6,915,993 B2 * | 7/2005 | O'Leary | 248/188.9 |
| 6,957,860 B1 * | 10/2005 | Leist et al. | 297/239 |
| 2006/0049320 A1 * | 3/2006 | Chen | 248/188.9 |

* cited by examiner

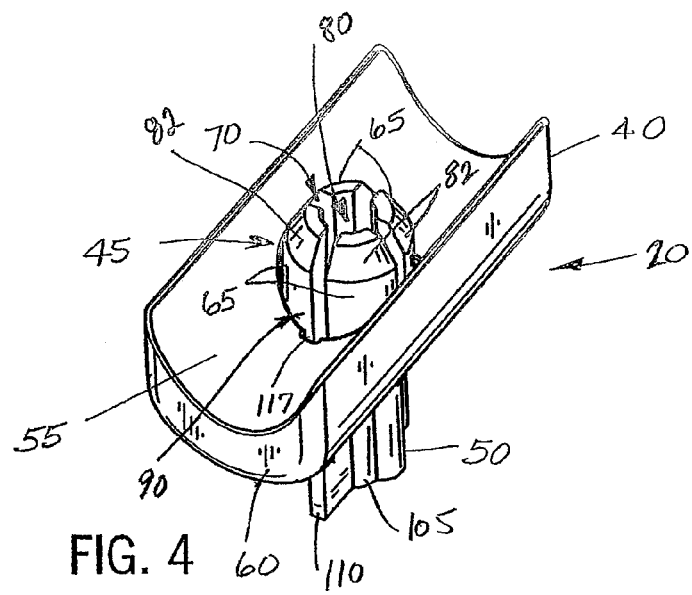
FIG. 4
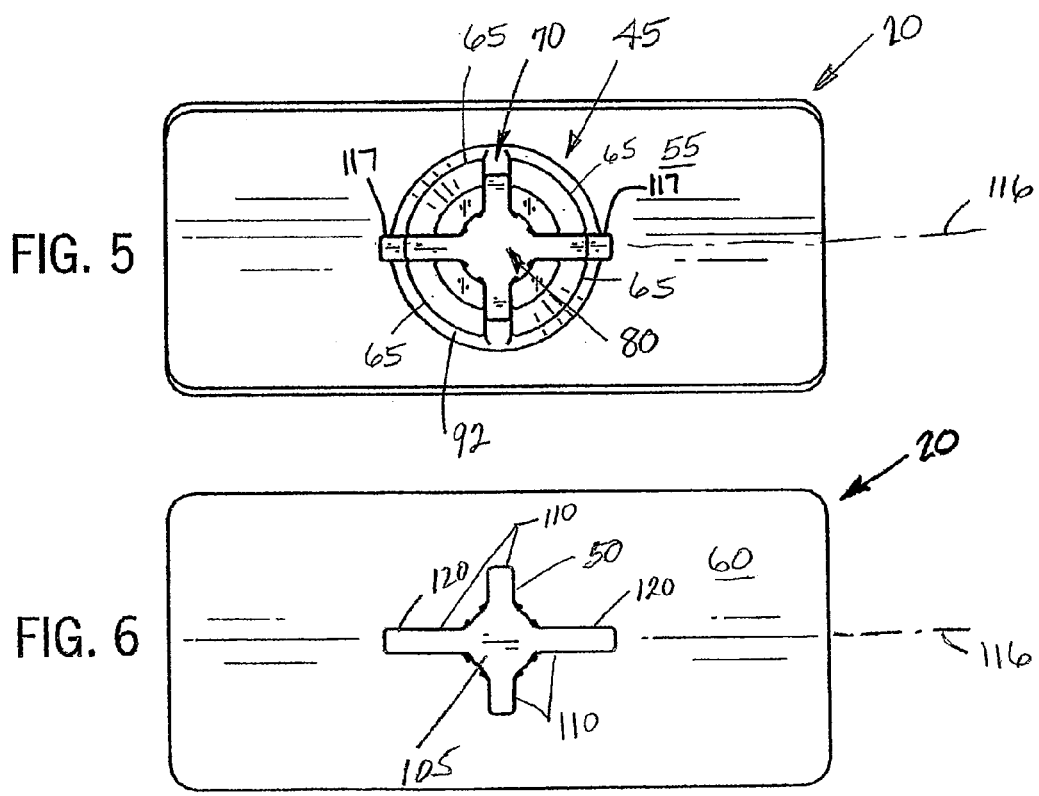
FIG. 5
FIG. 6

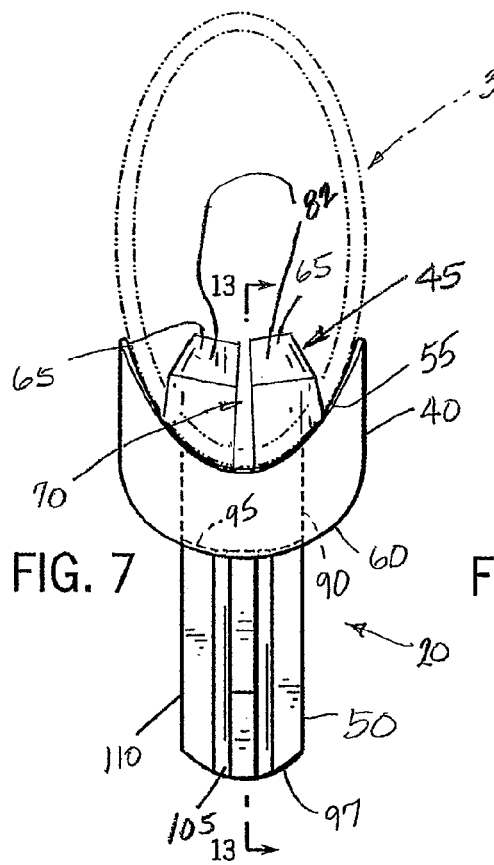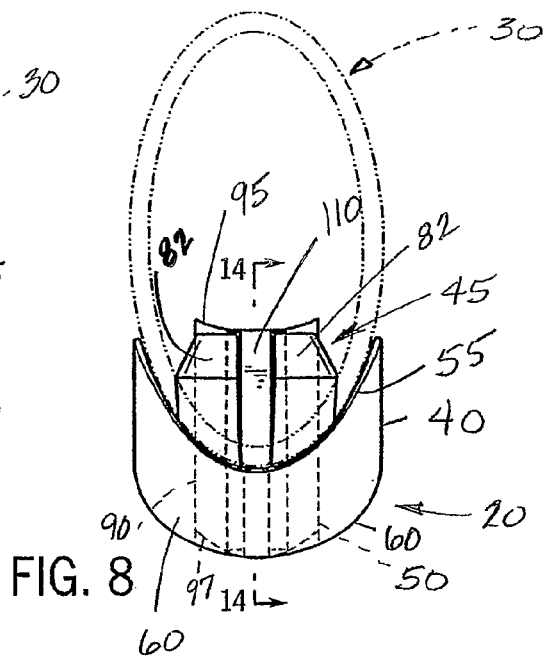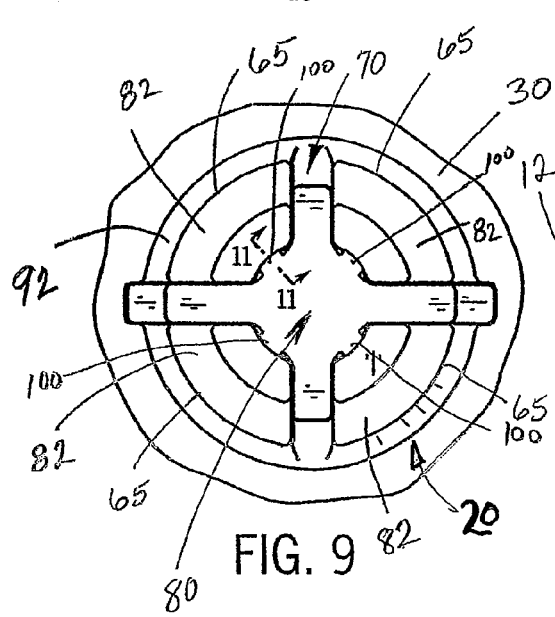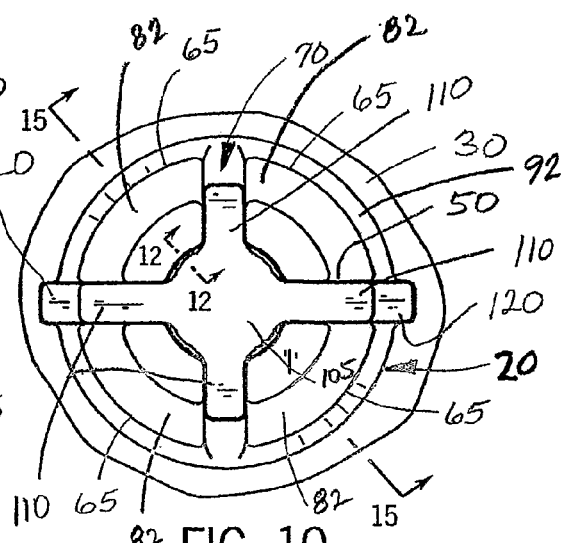

POUND-IN GLIDE FOR AN ARTICLE OF FURNITURE

CROSS-REFERENCE TO RELATED APPLICATION

This application claims the benefit of U.S. Provisional Application Ser. No. 60/460,065, filed Apr. 3, 2003.

BACKGROUND OF THE INVENTION

The present invention relates generally to furniture, and more particularly to a glide arrangement for an article of furniture such as a chair, in which the glide arrangement is configured for connection to a tubular support associated with the article of furniture.

There is a sizable and constant demand for rugged, comfortable and attractive utility chairs of the type used in schools, auditoriums, convention centers, hotels and the like. In an educational setting, it is common for such a chair to have a frame that supports a desktop or worksurface, to form a desk that may be used in a classroom or the like. These types of chairs are subjected to continuous and rigorous use. Typically, the frame for a chair of this type includes a tubular metal member that is bent into a desired configuration, which often includes a section that is adapted to rest on a support surface such as a floor. Typically, casters or glides are employed to permit the article of furniture to be slid and thus shifted from place to place without marring or excessively wearing the finish or surface of the floor.

Certain known types of glide arrangements are attached to the tubular frame of a chair or the like using rivets, screws or the like. For example, U.S. Pat. No. 3,724,897 discloses a certain known chair construction employing a glide arrangement that includes fastener glides fastened to runners of the chair by means of screws. While this type of glide arrangement functions satisfactorily to support the chair frame above a support surface such as a floor, it entails certain drawbacks in assembly and operation. For example, a glide of this type utilizes several components, which must be stocked separately and which require several steps in order to assemble the glide to the frame. In addition, the use of a screw or other fastener results in the head of the screw or other fastener becoming exposed as the surrounding areas of the glide wear away after extended periods of use. This causes the screw or fastener head to scratch or mar the floor or other surface during movement of the chair.

There thus exists a need for a glide arrangement that simplifies the construction and assembly of the glide to the article of furniture without sacrificing protection of the floor surface, and which prevents exposure of a fastener head in order to eliminate the potential for the glide to scratch the floor surface, even after extended usage.

SUMMARY OF THE INVENTION

The present invention contemplates a glide arrangement that is operable to overcome the drawbacks of the prior art as discussed in the preceding paragraphs by providing a uniquely constructed, easily installed and durable glide arrangement which serves as a satisfactory glide and floor surface protector. The glide arrangement of the present invention is formed of a plastic or equivalent material which is of requisite rigidity and which is configured for quick and easy installation on a tubular support for an article of furniture, and which is capable of providing support for the article of furniture while protecting the floor or other support surface, even after extended periods of use.

The glide arrangement of the present invention employs a floor engaging member that includes a plug section configured to be slidably inserted through an opening formed in a bottom support member of an article of furniture such as a chair. The plug section is capable of deflecting inwardly upon engagement with the opening in the support member. The plug section is then expandable into engagement with the edge area of the opening, to retain the plug section, and thereby the floor engaging member, in engagement with the support member of the article of furniture.

In one embodiment, the floor engaging member is in the form of a body having an engagement surface configured to engage a downwardly facing surface of the support member. The plug section is in the form of a mounting boss having a plurality of collapsible mounting boss sections. The boss sections define an axial passage therebetween and extending through the body. When inserted into the opening in the support member, the edge of the opening engages the boss sections and moves the boss sections radially inward relative to the edge of the opening, toward a collapsed condition. The glide arrangement further includes a wedge configured to be driven by an applied force into the passage defined by the mounting boss sections. The driven wedge is configured to move the boss sections apart and into engagement with the edge of the opening, to secure the body to the support member of the article of furniture.

In accordance with another aspect of the invention, the present invention provides a glide arrangement for use in supporting an article of furniture. The article of furniture includes one or more tubular members that support the article of furniture on a floor surface. The tubular member includes an opening configured to receive the glide arrangement. The glide arrangement includes a body having an upper surface and a lower surface. The upper surface has a series of boss sections having a space therebetween. The boss sections are configured to collapse radially inwardly, to allow the boss sections to be inserted through the opening in the tubular member. The glide arrangement also includes a wedge coupled to the body and aligned along an axis parallel to the boss sections. The wedge includes a series of radially-outward extending guide members aligned generally perpendicular relative to one other. The wedge is operable to force the collapsed boss sections in a radially outward direction such that the boss sections engage against the edge of the tubular member that defines the opening. Thereby, the pressure of the wedge against the boss sections secures the glide arrangement to the article of furniture.

The present invention also provides a method of mounting a support to an article of furniture that includes an opening defined by an edge of a furniture support member. The method of the invention comprises the steps of inserting a mounting boss associated with the support into the opening, wherein the mounting boss includes a number of mounting boss sections that define a passage therebetween; moving the boss sections into the opening, so that the boss sections move radially inward to a collapsed condition; driving a wedge into the passage defined by the boss sections; and moving the plurality of boss sections radially outward via inward movement of the wedge, so that the boss sections engage against the edge of the opening to secure the support to the article of furniture.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is an isometric view of the glide arrangement of the present invention;

FIG. 5 is a top view of the glide arrangement shown in FIG. 4;

FIG. 6 is a bottom view of the glide arrangement shown in FIG. 4;

FIG. 7 is a side elevation view of the glide arrangement or FIG. 4 coupled to a support member of an article of furniture, showing the glide arrangement in an unfastened position;

FIG. 8 is a side elevation view similar to FIG. 7, showing the glide arrangement in a fastened position;

FIG. 9 is a top view of the glide arrangement shown in the unfastened position of FIG. 7;

FIG. 10 is a top view of the glide arrangement shown in the fastened position of FIG. 8;

DETAILED DESCRIPTION OF THE INVENTION

Figures 1, 2, 3:
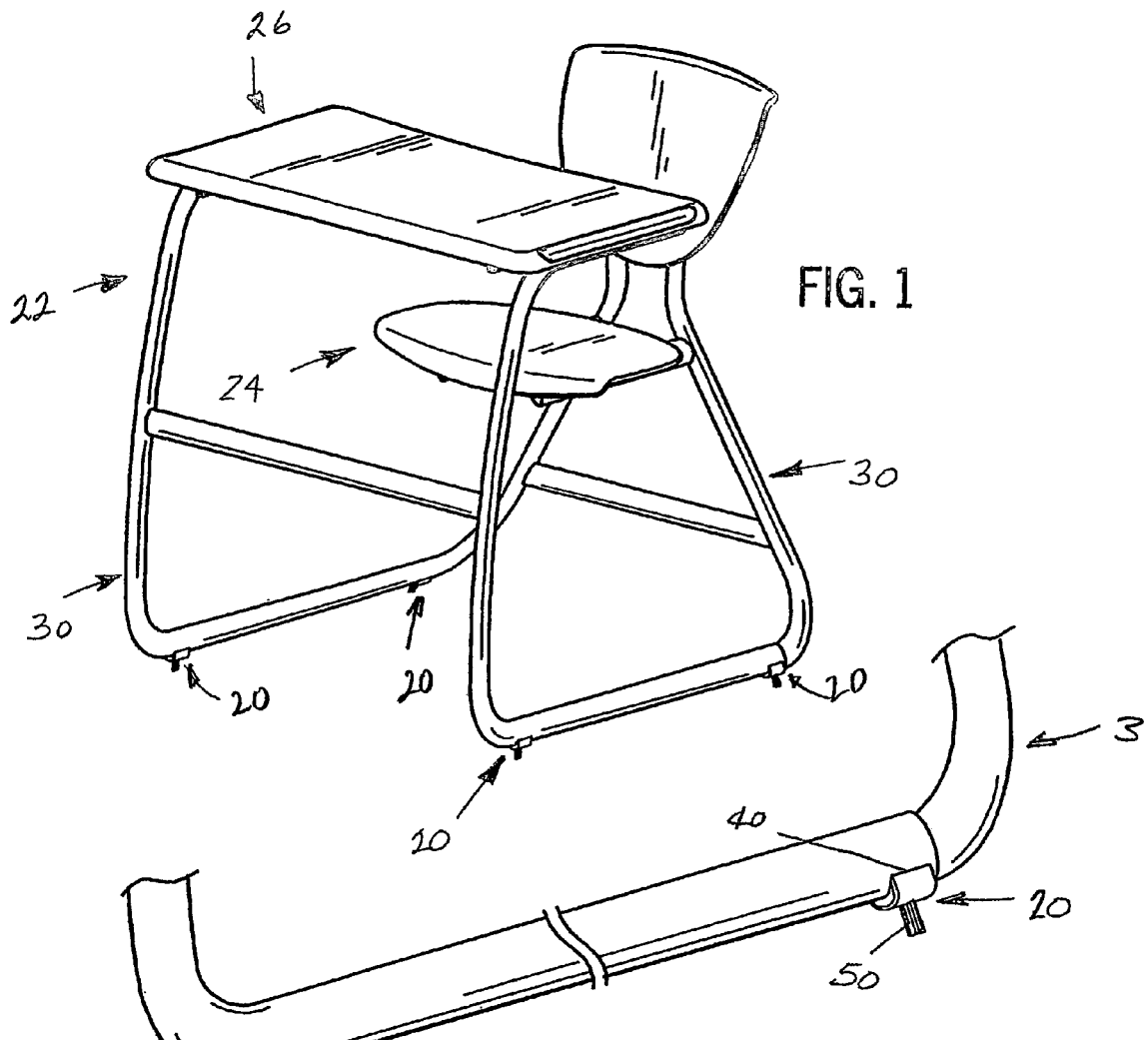
FIG. 1 is an isometric view of an article of furniture employing the glide arrangement of the present invention.
FIG. 2 is a detailed, partially exploded view of the glide arrangement of the present invention for mounting to the article of furniture shown in FIG. 1.
FIG. 3 is a partial, enlarged isometric view of a glide arrangement assembled on the article of furniture shown in FIG. 1.

Referring to FIG. 1, a support in the form of a glide arrangement 20 is adapted for connection to a surface of an article of furniture. In the illustrated embodiment, the article of furniture is in the form of a desk assembly 22 that includes a frame structure having a seat section 24 and a desk section 26, which are interconnected by a pair of runners 30. In this embodiment, the desk assembly 22 includes a frame that is constructed of metal tubing, which is bent to the illustrated configuration and assembled together with the seating and desk components to form the desk assembly 22. The glide arrangements 20 are mounted to each runner 30 adjacent opposite ends defined by the runner 30. In this manner, each glide arrangement 20 functions to elevate each runner 30 relative to the floor or other support surface on which the desk assembly 22 is adapted to be placed. It should be understood that the illustrated construction is representative, and that the glide arrangement 20 may be used in combination with any article of furniture, wall panel, or the like in which it is desirable to space a lower component of the furniture or wall panel above a floor surface, or relative to another component or any other surface.

Referring to FIGS. 2 and 4-6, the glide arrangement 20 generally includes a body 40 in combination with a plug section or boss 45 and a wedge 50. The body 40 defines an upper surface 55 configured to match the downwardly facing surface of the runner 30. In the illustrated embodiment, the upper surface 55 of the body 40 includes an arcuate-shaped channel configured to receive the arcuate-shaped outer surface of the runner 30. Again, it is understood that the upper surface 55 of the body 40 can have any satisfactory configuration, and may not necessarily have a configuration that matches or corresponds to the furniture component to which the glide arrangement 20 is adapted to be mounted.

As illustrated in FIGS. 3, 4 and 7, the body 40 further includes an outer surface 60 having a lower area adapted to rest on the floor or other supporting surface for the article of furniture. In the illustrated embodiment, the lower area is arcuate-shaped similar to the arcuate-shape of the runner 30. Yet, it is understood that the configuration of the lower area of the outer surface 60 can vary.

Referring to FIGS. 2, 4, 5 and 7, the boss 45 is adapted to be inserted into an opening 62 formed in the runner 30. The boss 45 is divided into a number of sections, which may be in the form of four identically-shaped boss sections 65, each of which is separated from the adjacent boss section 65 by a gap or space 70. The boss sections 65 surround a central passage 80, and the spaces 70 are in communication with the passage 80.

Each boss section 65 further includes a beveled or tapered inner edge 82. The tapered edges 82 of the boss sections 65 are configured to enhance insertion of the boss 45 into the hole 62 in the tubular frame structure of the runner 30, which has a diameter smaller than the diameter defined by boss 45. Yet, the shape (e.g., curvilinear, stepped, square, etc.) of the free ends of the boss sections 65 can vary.

Figure 13:
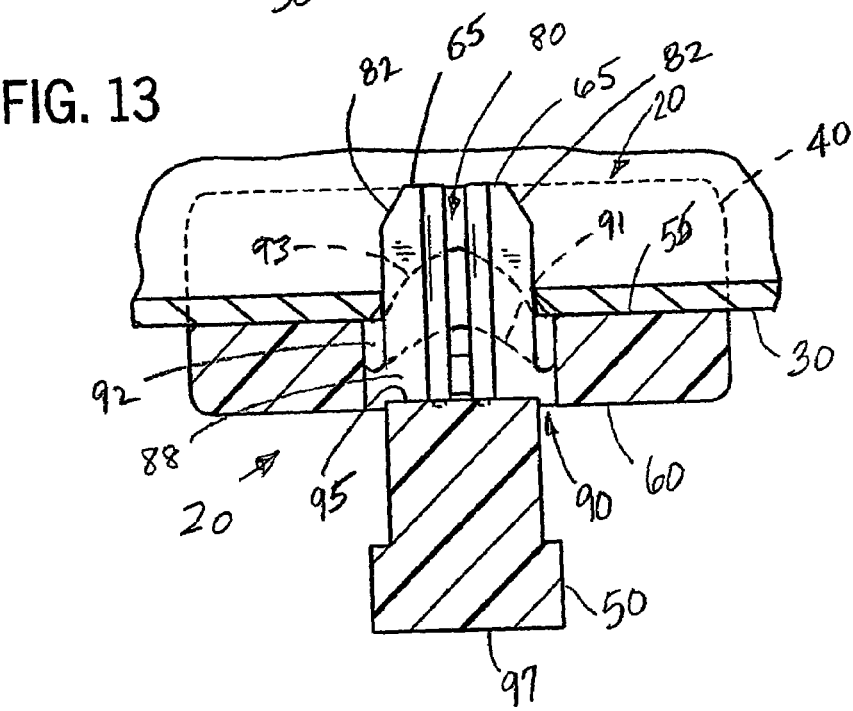
FIG. 13 is a partial cross section view along line 13-13 of FIG. 7.
Figure 14:
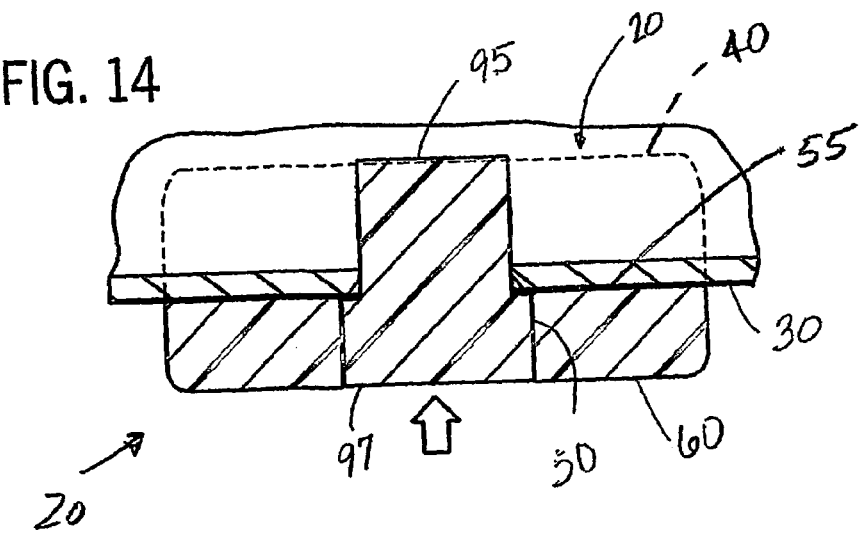
FIG. 14 is a partial cross section view along line 14-14 of FIG. 8.
Figure 15:
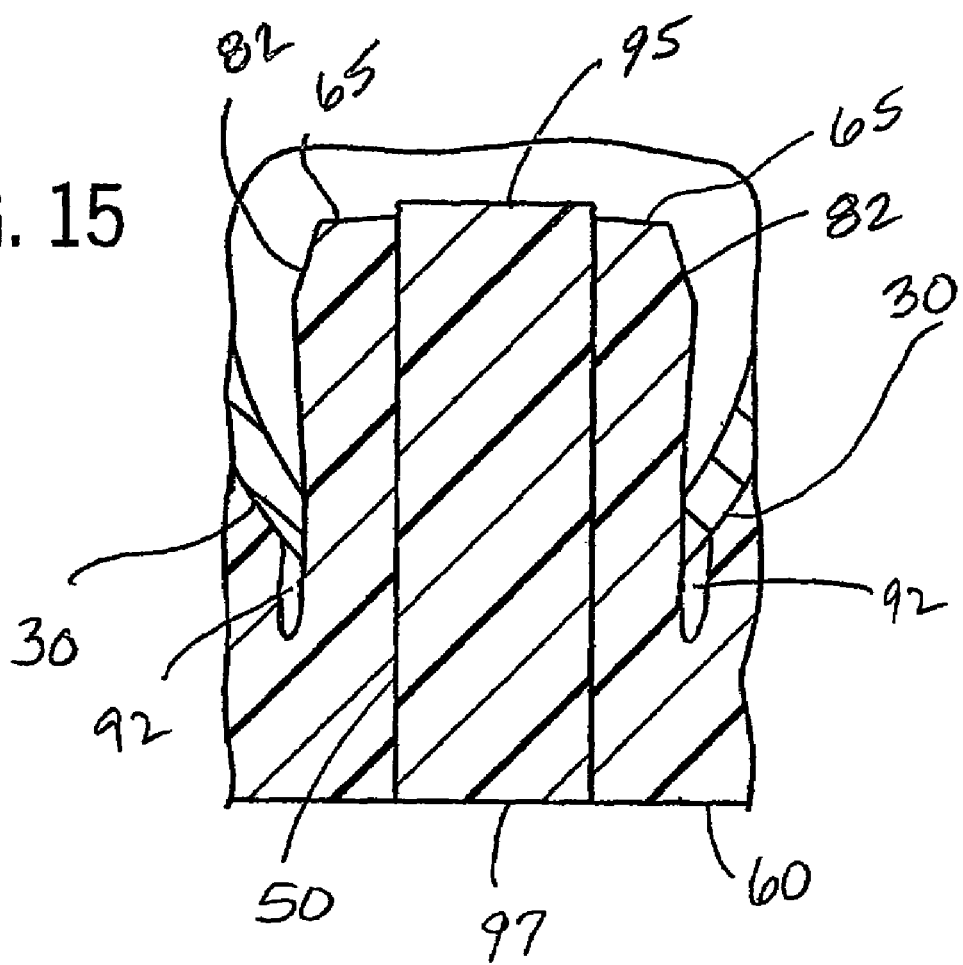
FIG. 15 is a partial cross section view along line 15-15 of FIG. 10.

Referring to FIGS. 4, 7 and 13, boss sections 65 extend upwardly from a base section 88, which is defined by the central area of body 40. In the illustrated embodiment, boss sections 65 and base section 88 are formed integrally with each other.

A passage or opening 90 is formed in base section 88, and extends along an axial direction between the outer surface 60 of the body 40 and an upper edge, shown at 91. Passage 90 is configured to have a cross section that matches that of spaces 70 and passage 80 of boss 45. That is, passage 90 includes four generally perpendicular passage sections that radiate outwardly from a central axial section. As illustrated in FIGS. 4 and 7, each space 70 between an adjacent pair of boss sections 65 is in communication and alignment with one of the outwardly radiating sections of the passage 90, and passage 80 of boss section 45 is in communication and alignment with the central axial section of passage 90.

An annular recess 92 is formed in body 60 around boss 45. Recess 92 separates boss sections 65 from body 60 above the upper edge 91 of base section 88. Recess 92 extends inwardly from an upper edge 93 that intersects with the upper surface 55 of body 40, and the lower extent of recess 92 is defined by the upper edge 91 of base section 88. This construction enables the boss sections 65 to flex toward and away from one other, for reasons to be explained.

Figure 11:
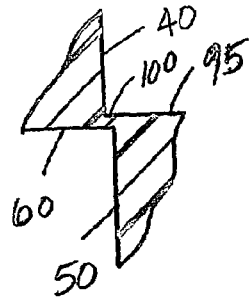
FIG. 11 is a partial cross section view along line 11-11 of FIG. 9.

Referring to FIGS. 7, 9 and 11-13, the wedge 50 and the body 40 are preferably formed of a thermoplastic material in the same molding operation, such that the wedge 50 and the body 40 are integrally coupled to one other. Wedge 50 is molded in an extended position in which wedge 50 extends outwardly from the outer surface 60 of the body 40. FIG. 11 illustrates the manner in which wedge 50 is molded or formed so as to be interconnected with body 60. The wedge 50 includes an inner end 95 that is interconnected with the material of the body 40 via frangible tabs or connectors 100. As shown in FIG. 7, the inner end 95 of the wedge 50 has a shape that corresponds to the outer surface 60 of the body 40, which in the illustrated embodiment is generally arcuate-shaped. As it is molded or formed as shown in FIG. 11, the inner end 95 of the wedge 50 is located slightly inwardly from the outer surface 60 of the body 40, and the frangible connectors 100 comprise portions of material that extend between the inner end 95 of the wedge 50 and the adjacent edges the central axial section of passage 90, at a location at which passage 90 opens onto the outer surface 60 of the body 40. Each connector 100 is located between the inner ends of an adjacent pair of outwardly radiating sections of passage 90.

As illustrated in FIGS. 7, 8, 14, and 15, an outer end 97 of the wedge 50 is also arcuate-shaped, and defines an outer surface that corresponds to the arcuate outer surface 60 of the body 40. When the wedge 50 is driven into the opening 90 of the body 40, as will be explained, the outer end 97 of the wedge is generally flush with the outer surface 60 of the body 40 and acts with the body 40 to provide a glide and surface protector for the article of furniture.

Referring to FIGS. 4, 6-8, and 10, the wedge 50 includes an axially-extending central section 105 integrally coupled with a series of radially-outward extending guide members 110 aligned generally perpendicular relative to one other. The central section 105 has a cross-section that generally conforms to and is in alignment with that of the central passage 80 defined by the boss 45 and the central axial section of passage 90 in base section 88. Central section 105 has a length slightly greater than the combined thickness of base section 88 and height of boss 45. As shown in FIGS. 8 and 10, each guide member 110 has a cross-section that conforms to and is in alignment with one of spaces 70 defined by boss 45 and an aligned outwardly radiating section of passage 90. Each guide member 110 has a length slightly greater than the combined thickness of base section 88 and an aligned one of the spaces 70 between the boss sections 65. In the illustrated embodiment of the wedge 50, two of the guide members 110 are located in alignment with the longitudinal axis 116 of the body 40, and the other two of the guide members 110 are oriented transversely to the longitudinal axis 116 of the body 40, and in alignment with each other. Each longitudinally extending guide member 110 may include a radially outwardly extending tab 120 operable to be driven into an outer area 117 of one of the outwardly radiating sections of passage 90 defined in the body 40.

In operation, the glide arrangement 20 is mounted to the runner 30 as follows. Initially, the hole 62 is formed in the runner 30 in the location at which the glide arrangement 20 is to be mounted. The diameter of the hole 62 is smaller than the diameter defined by the boss 45. As noted previously, the runner 30 is formed of a tubular material, such that the material of the runner 30 defines a circular or curvilinear edge bordering the hole 62, which is in communication with the passage defined by the runner 30 due to its tubular construction. The boss 45 of the wedge 50 is inserted into the hole 62 formed in the runner 30.

As shown in FIGS. 7 and 13, the tapered edge 82 of each boss section 65 facilitates engagement of the boss 45 with the edge of the hole 62. An axial force applied to the body 40 (e.g., application of a pushing force on the body 40 on either side of the wedge 50) fully inserts the boss 45 into the hole 62. As the boss 45 enters through the hole 62, the upper surface 55 of the body 40 engages the surface of the runner 30 adjacent to the hole 62. The edge of the hole 62 rides along the outer surfaces of the boss sections 65 to cause the boss sections 65 to collapse together. The collapse of the boss sections 65 closes the spaces 70 between the adjacent boss sections 65 and moves boss sections 65 inwardly into the central passage 80. The outer surfaces of boss sections 65 engage the edge of hole 62, to maintain the glide arrangement 20 in frictional engagement with runner 30.

Figure 12:
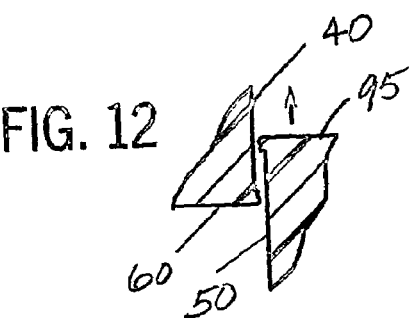
FIG. 12 is a partial cross section view along line 12-12 of FIG. 10.

After the boss sections 65 collapse upon insertion of the boss 45 into the hole 62, the user pounds or applies an axial insertion force to move the wedge 50 inward through the hole 62, typically by striking the outer end 97 of wedge 50. The inward force applied to wedge 50 breaks frangible tabs 100 between the body 40 and the wedge 50, as illustrated in FIG. 12, and causes wedge 50 to move into passage 90 in base section 88. As shown in FIGS. 8 and 10, continued inward movement of the wedge 50 forces each guide member 110 into the aligned space 70 between boss sections 65, and also forces the central section 105 of the wedge 50 into the central passage 80. Such inward movement of the wedge 50 also S forces the collapsed together boss sections 65 to move radially outwardly apart relative to one another. Such outward movement of the boss sections 65 by inward movement of wedge 50 functions to drive the outer surfaces of the boss sections 65 into engagement with the edge of the opening 62. The outer surface of each boss section 65 engages the edge of the opening 62 in the vicinity of each boss section 65 adjacent the upper surface 55 of the body 40. In this manner, the edge of the opening 62 digs into each boss section 65, functioning to maintain the body 40 in engagement with the runner 30.

FIGS. 3, 8, 10, and 14-15 illustrate the glide arrangement in a fastened positioned. The wedge 50 is driven into the body 40 such that the outer end 97 of the wedge 50 is flush with the outer surface 60 of the body 40 and the outwardly extending tabs 120 are received in one of the outwardly radiating sections of passage 90. The configuration of the outer end of the wedge 50 is of a shape that enables the wedge 50 to be positioned in a flush relationship with the outer surface 60 of the body 40.

It can thus be appreciated that the glide arrangement 20 provides a one piece construction that combines both the glide itself as well as the means by which the glide is coupled to the article of furniture. This arrangement replaces a three piece assembly of the prior art, which includes a glide, a washer and a screw that is threaded into a tapped hole formed in the runner or other furniture components to which the glide is to be assembled. This construction further eliminates the need to tap the hole used to mount the glide. Accordingly the present invention provides a significant decrease in the number of parts that must be handled in order to mount the glide to the article of furniture, and also provides a mounting method which is quicker and simpler than in the prior art.

While the invention has been shown and described with respect to a specific embodiment, it is contemplated that certain details may vary from the specific construction as disclosed, while still falling within the scope of the present invention. For example, and without limitation, while boss 45 is illustrated as having a round cross section, it is contemplated that the cross section of the space 70 may also be noncircular. In an arrangement such as this the opening of the furniture component has a corresponding shape, and in any event must have a configuration that functions to collapse the boss sections when the boss is inserted into the opening. Further, while the boss 45 is shown as being divided into four sections, it is also contemplated that the boss 45 may be divided into any number of sections which can be collapsibly engaged within the opening and then forced outwardly into engagement with the edges of the opening. In addition, it is also contemplated that the wedge 50 may be formed separately from the body 40. While this does not provide the one piece construction as shown and described, and nonetheless reduces the overall part count and provides a significantly simpler and quicker installation method, relative to the known prior art, by providing a pound-in construction rather than a construction that is secured in place via a screw-type fastener. In addition, while the glide arrangement of the present invention has been shown and described as being engaged with a tubular support for the article of furniture, it is understood that the glide arrangement of the invention may be mounted to any portion of an article of furniture that faces a support surface such as a floor, and which is capable of having an opening formed therein for receiving and mounting the glide arrangement. In addition, it is understood that the glide arrangement of the present invention maybe used in connection with any type of furniture, and is not limited to use in combination with a desk as shown and described.

Various alternatives and embodiments are contemplated as being within the scope of the following claims particularly pointing out and distinctly claiming the subject matter regarded as the invention.

I claim:

1. A support for an article of furniture, comprising:
    a furniture support member having a lower portion that extends parallel to a support surface and which defines a downwardly facing arcuate outer surface having an opening having an edge; and
    a glide for connection to the lower portion of the support member, wherein the glide comprises:
        a body having an arcuate inner engagement surface, wherein the arcuate inner engagement surface has a curvature that matches that of the downwardly facing arcuate outer surface defined by the lower portion of the support member, wherein the body includes a boss having a plurality of spaced apart collapsible mounting boss sections that define an axial passage therebetween, and wherein engagement of the mounting boss sections with the edge of the opening in the furniture support member causes the mounting boss sections to move radially inward relative to the edge of the opening toward a collapsed condition; and
        a wedge configured to be driven by an applied force into a passage defined by the body and into the passage defined by the mounting boss sections, wherein the wedge moves the mounting boss sections apart from the collapsed condition into engagement with the edge of the opening to secure the body to the furniture support member, and wherein engagement of the mounting boss sections with the edge of the opening functions to maintain the arcuate inner engagement surface of the body against the downwardly facing arcuate outer surface defined by the lower portion of the support member.

2. The support of claim 1, wherein the wedge is initially formed in an extended position, wherein the wedge is interconnected with the body via one or more frangible connectors, and wherein the one or more frangible connectors are operable to break when the wedge is subjected to the applied force that moves the wedge from the extended position into the passages defined by the body and the boss sections.

3. The support of claim 1, wherein each of the plurality of mounting boss sections includes a free end having a tapered edge configured to enhance insertion of the mounting boss sections into the opening.

4. The support of claim 1, wherein adjacent mounting boss sections define a space therebetween.

5. The support of claim 4, wherein the wedge includes one or more radially-outward extending guide members aligned generally perpendicular relative to one another.

6. The support of claim 5, wherein each of the radially-outward extending guide members is operable to move into one of the spaces aligned with each guide member and defined by the adjacent mounting boss sections.

7. The support of claim 1, wherein the wedge includes an inner end and an outer end, and wherein the body includes an outer surface that faces outwardly relative to the inner surface, and wherein the outer end of the wedge and the outer surface of the body have a matching arcuate configuration.

8. A support for an article of furniture having an opening having an edge, comprising:
    a body having a boss that includes a plurality of collapsible spaced apart mounting boss sections that define an axial passage therebetween, wherein engagement with the edge of the opening in the article of furniture causes the mounting boss sections to move radially inward relative to the edge of the opening toward a collapsed condition; and
    a wedge configured to be driven by an applied force into a passage defined by the body, wherein the wedge includes one or more radially-outward extending guide members aligned generally perpendicular relative to one another, wherein the wedge moves the boss sections apart against the edge of the opening to secure the body to the article of furniture, and wherein the one more radially-outward extending guide members are operable to move into an aligned space defined by adjacent mounting boss sections;
    wherein one or more of the radially-outward extending guide members includes a tab extending radially outward from the guide member, and wherein the body includes one or more outer areas in communication with the passage defined by the body, wherein the outer areas are configured to receive the tab.

9. A method of mounting a support to an article of furniture, comprising the steps of:
    providing a furniture support member having a lower portion that extends parallel to a support surface and which defines a downwardly facing arcuate outer surface having an opening having an edge;
    connecting a glide to the lower portion of the support member, wherein the glide includes a body having an arcuate inner engagement surface, wherein the arcuate inner engagement surface has a curvature that matches that of the downwardly facing arcuate outer surface defined by the lower portion of the support member, wherein the body includes a boss having a plurality of spaced apart collapsible mounting boss sections that define an axial passage therebetween;
    inserting the mounting boss into the opening, wherein the mounting boss sections move radially inward to a collapsed condition;
    driving a wedge into a passage defined by the body and into the passage defined by the plurality of boss sections; and
    moving the plurality of boss sections radially outward against the edge of the opening by movement of the wedge, such that the glide is secured to the furniture support member, wherein engagement of the mounting boss sections with the edge of the opening functions to maintain the arcuate inner engagement surface of the body against the downwardly facing arcuate outer surface defined by the lower portion of the support member.

10. The method of claim 9, wherein the wedge is formed integrally with the body and interconnected by a frangible connector that maintains the wedge in an extended position relative to the body, and wherein the driving step includes breaking the frangible connector between the wedge and the body to enable inward movement of the wedge into the passage defined by the body.

11. The method of claim 10, further including the step of aligning a lower end of the wedge with an outer surface of the body.

12. The method of claim 11, wherein the wedge includes a plurality of guide members extending radially outward relative to one another, wherein adjacent boss sections define a space therebetween, and wherein the method includes the step of driving each of the guide members into one of the spaces defined between adjacent boss sections.

13. A method of mounting a support to an article of furniture having an opening having an edge, comprising the steps of:
   inserting a mounting boss associated with the support into the opening, wherein the mounting boss includes a plurality of spaced apart mounting boss sections that define a passage therebetween, and wherein a space is defined between adjacent boss sections;
   moving the plurality of boss sections radially inward to a collapsed condition;
   providing a wedge having an inner end and an outer end and a plurality of guide members extending radially outward relative to one another;
   positioning the inner end of the wedge adjacent an outer surface defined by a body; and
   driving the wedge into the passage defined by the plurality of boss sections, wherein the wedge is formed integrally with the body and interconnected by a frangible connector that maintains the wedge in an extended position relative to the body, and wherein the step of driving the wedge includes breaking the frangible connector between the wedge and the body to enable inward movement of the wedge into the passage, and further includes driving each of the guide members into one of the spaces defined between adjacent boss sections;
   moving the plurality of boss sections radially outward against the edge defining the opening by movement of the wedge, such that the support is secured to the article of furniture;
   wherein the body includes a first outer area and a second outer area in communication with a passage defined by the body and generally aligned along a longitudinal axis of the body, wherein each of a pair of guide members of the wedge includes a tab extending radially outward from the guide member in general alignment with the first and the second outer areas; and
   wherein the step of driving the wedge into the passage defined by the plurality of boss sections includes driving the tabs into the respective outer areas to secure the position of the support relative to the article of furniture.

14. For use in supporting an article of furniture of a type having a construction of at least one tubular legs in support of the article of furniture on a floor surface, a glide arrangement configured to be employed between the tubular leg and the floor surface, the at least one tubular legs having an opening having an edge and receiving the glide arrangement, the glide arrangement comprising:
   a body having an upper surface and a lower surface, the upper surface having a plurality of spaced apart boss sections having a passage therebetween and having a space between adjacent boss sections, the boss sections configured to collapse radially inward and insert through the opening in the tubular leg; and
   a wedge coupled to the body and aligned along an axis parallel to the boss sections, the wedge including a plurality of radially-outward extending guide members aligned generally perpendicular relative to one other, wherein the wedge is movable into the body and wherein the one more radially-outward extending guide members are operable to move into the respective spaces defined between the adjacent boss sections, wherein movement of the wedge into the body is operable to force the boss sections in a radially outward direction such that the boss sections engage against the edge of the opening to secure the glide arrangement to the article of furniture;
   wherein one or more of the radially outward extending guide members includes a tab extending radially outward from the guide member, and wherein the body includes one or more outer areas in communication with a passage defined by the body, each of which is configured to receive one of the tabs.

15. The glide arrangement of claim 14, wherein the wedge is initially formed in an extended position, wherein the wedge is interconnected with the body via one or more frangible connectors, and wherein the one or more frangible connectors are operable to break when the wedge is subjected to an applied force that moves the wedge from the extended position into the passages defined by the body and the boss sections.

16. The support of claim 14, wherein each of the plurality of mounting boss sections includes a free end having a tapered edge configured to enhance insertion of the mounting boss sections into the opening in the article of furniture.

* * * * *